United States Patent Office 3,375,294
Patented Mar. 26, 1968

3,375,294
OLEFIN POLYMERIZATION WITH A POTASSIUM-AMINE-ACTIVATED CARBON CATALYST
William O. Beavers, El Paso, Tex., assignor to El Paso Natural Gas Products Company, a corporation of Texas
No Drawing. Filed Feb. 11, 1963, Ser. No. 257,795
9 Claims. (Cl. 260—683.15)

This invention relates to the polymerization of olefinic materials and novel catalyst compositions therefor. More particularly, this invention is directed to an improved catalytic polymerization process whereby a wide range of polymerization products are produced varying from low molecular weight dimers, trimers and tetramers to high molecular weight polymeric wax-like and solid materials depending upon the details of the manner in which the polymerization is effected.

Reactions involving the polymerization of olefinic materials are well known and as is also well known, these polymerization reactions usually involve the use of a catalyst. Equally well known in the polymerization arts is the fact that catalysts are not universal, generally, without regard to their selectivity concerning the specific types of products produced. Of particular interest are catalytic polymerization processes for the polymerization of acyclic mono-olefinic hydrocarbons to produce normally liquid products, particularly dimerization products of propylene to form products of the hexene type which find immediate and practical utility in the manufacture of high-melting polyhydrocarbon fibers and films.

Accordingly, an object of this invention resides in the provision of a novel catalytic polymerization process for the polymerization of acyclic mono-olefinic materials.

Another object of this invention is to provide a method suitable for the polymerization of acyclic mono-olefins to produce normally liquid hydrocarbon products.

Still another object of this invention is directed to the provision of a catalytic process for the dimerization of propylene to produce a hexene product rich in 4-methyl-1-pentene.

It has now been discovered that an unexpected improvement in the polymerization of acyclic mono-olefinic materials is obtained when an olefinic material, such as propylene, is polymerized or copolymerized under polymerizing conditions in contact with a catalyst composition containing essentially a univalent, mostly basic, metal of the Group I series of the Periodic Table, a carbonaceous material and a nitrogen-containing compound having an amino function.

The univalent, mostly basic, metals of the Group I series of the Periodic Table which are useful as components of the catalyst compositions of the invention comprise the alkali metals such as sodium, potassium, lithium, rubidium and cesium. These metals may be employed as the sole metal in the catalyst composition or as mixtures of one or more of the alkali metals in substantially liquid form, as a slurry in a solvent or in one or more of the reaction products, as a metallic film deposited on a support or as a solid in a fixed or fluidized bed system.

In admixture with one or more of the alkali metals described above, are carbonaceous materials as the second ingredient of the catalyst compositions of the invention. The carbonaceous materials which find utility in the manufacture of the catalyst compositions of the invention are those carbonaceous materials which are amorphous in nature and have a specific gravity of less than 2.25. Representative carbonaceous materials which can be employed are those materials rich in carbon found in nature or derived from material wherein carbon is a constituent as in coal, petroleum and asphalt materials. Carbon obtained artificially, in varying degrees of purity, as carbon black, lamp black, activated carbon, charcoal and coke are suitable sources which can be employed to obtain carbon in the manufacture of the catalyst compositions of the invention.

The third essential ingredient of the catalyst composition of the invention comprises a nitrogen-containing compound having an amino function. Representative nitrogen-containing compounds having an amino function which have been determined as suitable candidates as ingredients of the catalyst composition of the invention include ammonia, the primary, secondary and tertiary, aliphatic and aromatic amines such as methylamine, dimethylamine, triethylamine, ethylamine, isopropylamine, dipropylamine, diisopropylamine, sec-butylamine, tert-butylamine, allylamine, diallylamine, n-amylamine, n-hexylamine, di-(2-ethylhexyl) amine, laurylamine, 2-ethylhexylamine, n-butylamine, diethylamine, triamylamine, dibutylamine, isoamylamine, diamylamine, methyldiethylamine, tripropylamine, triethylamine, triamylamine, methylethylamine, ethylenediamine, propylenediamine, butylenediamine, pentylenediamine, trimethylenediamine, and the like.

The amount of the catalyst compositions of this invention which is employed in the polymerization of olefinic materials can vary over a wide range. Relatively small amounts of the catalyst compositions provide the desired activating effect and, in general, it has been found that amounts of catalyst composition utilized in the reaction falling in the range of from 0.01 weight percent to 25.0 weight percent based on the olefinic material or higher are suitable in accelerating the polymerization reaction at economically desirable reaction rates.

The ratio of the amounts of carbon to alkali metal to amine is not necessarily a critical feature of the invention and generally the ratio of amounts will be in the range of from 0.01 to 100 and preferably from 0.5 to about 10 moles of carbon per mole of alkali metal, although amounts above and below this range can be employed satisfactorily. Relatively small amounts of amine provide the desired catalytic effect and, in general, it has been found that from 0.001 weight percent to 5 weight percent based on the olefinic material or higher are suitable amounts of amine.

The catalyst compositions of the invention are conveniently prepared by intimately mixing a previously dried carbonaceous material such as carbon, an alkali metal such as potassium, and an amine in an inert atmosphere at an elevated temperature of about 150° C. in any suitable mol ratio of carbon to alkali metal such as, for example, 10:1. Mixing under the above conditions is continued for a period sufficient to insure intimate association of carbon particles with the alkali metal. Suitable mixing periods of from 20 minutes to about 50 minutes have been found adequate and sufficient to insure the provision of a catalyst composition capable of polymerization in olefinic material.

The catalyst compositions prepared in this manner can comprise many things including, perhaps, a complex of the alkali metal, carbon and amine; a physical admixture of the alkali metal, carbon, and amine; or an association product of the alkali metal and carbon wherein a plurality of moles of carbon are associated with a mole of an alkali metal, and admixed with amine; or a product of the alkali metal and the amine, admixed with carbon.

The materials which are polymerized in accordance with this invention are those corresponding to the general formula:

$$H_2C=CH-X$$

wherein X represents hydrogen, halogen, alkyl, haloalkyl, aminoalkyl, nitrile, and the like.

A preferred class of materials for polymerization in accordance with this invention are the polymerizable hydrocarbons containing a $CH_2=C<$ radical. A preferred class of polymerizable hydrocarbons as reactants in the process of the invention are the aliphatic 1-olefins having up to and including 5 carbon atoms per molecule. Specifically, the normal 1-olefin, propylene, has been found to polymerize to a polymer thereof upon being contacted with the catalyst compositions of this invention at a faster rate than has been achieved in the processes of the prior art. Examples of other polymerizable hydrocarbons which can be used in the process of this invention are ethylene and 1-butene. Branched chain olefins can also be used, such as 2-methylpropene (isobutylene). Also, 1,1-dialkyl-substituted and 1,2-dialkyl-substituted ethylenes can also be used such as 2-butene, 2-methyl-2-butene, 2-pentene, 2-methyl-1-butene, and the like. Diolefins in which the double bonds are in non-conjugated positions, such as 1,4-pentadiene, can be used in accordance with this invention. Cyclic olefins can also be used, such as cyclohexene. Mixtures of the foregoing polymerizable hydrocarbons can be polymerized to a polymeric material in the presence of the novel catalyst as, for example, by copolymerizing ethylene and propylene, ethylene and 1-butene, propylene and 1-butene, or propylene and a pentene. Aryl olefins, such as styrene and alkyl-substituted styrenes can also be polymerized to a polymeric material in accordance with the teachings of this invention. This invention is also applicable to the polymerization of a monomeric material comprising conjugated dienes containing up to 5 carbon atoms. Examples of conjugated dienes which can be used include 1,3-butadiene, 2-methyl-1,3-pentadiene, chloroprene, 1-cyanobutadiene, and the like. It is within the scope of the invention to polymerize such conjugated dienes either alone or in admixture with each other and/or with one or more other compounds containing an active $CH_2=C<$ group which are copolymerizable therewith. Included among these latter compounds are mono-olefins such as those described hereinabove. Other examples of compounds containing an active $CH_2=C<$ group which are copolymerizable with one or more conjugated dienes are styrene, acrylonitrile, methacrylonitrile, vinyl chloride, 2-methyl-5-vinylpyridine, 2-vinylpyridine, 4-vinylpyridine and the like.

One of the important advantages obtained in the polymerization of olefins in the presence of the catalyst compositions of the invention is that faster reaction rates can be achieved than in certain of the prior art processes. The temperature can be varied over a rather broad range, such as from about 50° C. and below to 500° C. and above. The preferred temperature range is from 100° C. to 250° C. Although pressures ranging from atmospheric and below up to 1,000 atmospheres or higher can be employed, a pressure from atmospheric to 100 atmospheres is usually preferred.

In this connection, it is noted that it is preferred to carry out the reaction in the gaseous phase without a diluent. However, the polymerization process of this invention proceeds in the presence of an inert, organic diluent, preferably a hydrocarbon, with a pressure sufficient to maintain the diluent in the liquid phase, giving rise to a so-called "mixed-phase" system. The preferred pressure range set forth above has been found to produce the desired polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane, are especially useful when the process is carried out at low temperatures. However, the higher molecular weight paraffins and cycloparaffins, such as isooctane, cyclohexane and methylcyclohexane, and aromatic diluents, such as benzene, toluene and the like, can also be used, particularly when operating at higher temperatures. Mixtures of any two or more of the above-named diluents can also be employed in the process of this invention.

The process of this invention can be carried out as a batch process by pressuring the olefinic material into a reactor such as an autoclave containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefinic material that is polymerized. However, the residence time for the polymerization of aliphatic mono-olefins, within the preferred temperature range of 100 to 250° C. falls within the range of 20 minutes to an hour or more. In the batch process, the time for the reaction can also vary widely, such as up to 24 hours or more.

It has also been found that incremental additions of catalyst components improve the selectivity of certain desired products such as 4-methylpentene-1. For example, in one experiment, the addition of a catalyst composition containing carbon, metal and amine in the ratio of 1:2:0.5 gave a lower selectivity to 4-methylpentene-1 than another experiment carried out under substantially the same conditions but which was followed by an incremental addition of metal and amine to provide a catalyst having the same proportions as above.

It has been found that various materials in some instances may have a tendency to inactivate the catalyst compositions of this invention. These materials include carbon dioxide, oxygen, water, and sulfur. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material should generally be freed of contaminants, such as water, oxygen and the like. It is desirable, also, that air and moisture be removed from the reaction vessel before the reaction is carried out. However, in some cases, small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the polymer are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. When the polymerization conditions were maintained to produce a wax-like or solid polymer, the recovery of the desired product can be aided by passing the same into a comminution zone, such as a Waring Blendor, so that a finely divided polymer is thereby provided. The polymer is then separated from the diluent and treating agents, e.g., by decantation or absorption, after which the polymer is dried. The diluent and treating agents can be separated by any suitable means, e.g., by fractional distillation, and reused in the process. When, however, the polymerization process is conducted under conditions conducive to the production of dimers of olefins, such as propylene, product recovery is readily achieved by any convenient means as by distillation.

The following detailed examples will serve to illustrate the principles and practices of the invention. The carbonaceous material used in the examples was "Pittsburgh" activated carbon, type SGL 8 x 30 mesh, produced by Pittsburgh Coke & Chemical Co., Pittsburgh, Pennsylvania. In analyzing the products gas chromatographic techniques were employed to determined the major components which were collected individually in ice traps cooled with Dry Ice-acetone baths. The components were further identified by infrared (IR) and nuclear magnetic resonance (NMR) spectroscopy.

*Example 1*

Five grams (0.42 mole) of carbon, previously oven-dried at 140° C. for 16 hours, was placed in a 500-ml. autoclave equipped with stirrer. The autoclave was purged for 10 minutes with dry, oxygen-free argon. While the purging was continued, 15 grams (0.38 mole) of potassium and 1.5 grams of dipropylamine were added to the autoclave. Under pressure, 251.2 grams of propylene was added. The reaction vessel was heated to 150° C. and held at that temperature for 1.25 hours. During this period, the pressure in the reaction vessel decreased from 2880 p.s.i.g. to 1395 p.s.i.g. The liquid product was removed from the reaction vessel and analyzed. Analysis indicated that 36.8% of the propylene had polymerized, being converted into 75.9% of 4-methyl-1-pentene, 14.0% of 4-methyl-2-pentene, 8.3% of other hexenes, and 1.8% of higher molecular weight polymers.

*Example 2*

A 7.5-gram (0.63 mole) sample of dried granular carbon was placed in a 500-ml. autoclave. To this reaction vessel were added 15 grams (0.38 mole) of potassium, 1.5 grams of dipropylamine, and 251.0 grams of propylene. The reaction mixture was heated at 150° C. for 1.25 hours. During this period, the pressure in the reaction vessel decreased from 3350 p.s.i.g. to 800 p.s.i.g. The liquid product was removed from the reaction vessel and analyzed. Analysis indicated that 38.4% of the propylene had polymerized, being converted into 79.2% of 4-methyl-1-pentene, 11.1% of 4-methyl-2-pentene, 7.4% of other hexenes, and 2.3% of higher molecular weight polymers.

*Example 3*

A 5-gram (0.42 mole) sample of dried carbon was placed in a 500-ml. autoclave. To this reaction vessel were added 15 grams (0.38 mole) of potassium, 9.6 grams of dipropylamine and 251.1 grams of propylene. The reaction mixture was heated at 150° C. for 1 hour. During this period, the pressure in the reaction vessel decreased from 2960 p.s.i.g. to 1500 p.s.i.g. The liquid product was removed from the reaction vessel and analyzed. Analysis indicated that 33.2% of the propylene had polymerized, being converted into 64.9% of 4 - methyl - 1 - pentene, 23.5% of 4 - methyl - 2 - pentene, 9.1% of other hexenes, and 2.5% of higher molecular weight polymers.

*Example 4*

A 5-gram sample of dried carbon was placed in a 500-ml. autoclave. To this reaction vessel were added 10 grams (0.26 mole) of potassium, 263.8 grams of propylene, and 0.8 gram of dipropylamine. The reaction mixture was heated at 150° C. for 5.8 hours. During this period, the pressure in the reaction vessel decreased from 3325 p.s.i.g. to 800 p.s.i.g. The liquid product was removed from the reaction vessel and analyzed. Analysis indicated that 51.3% of the propylene had polymerized, being converted into 70.7% of 4 - methyl - 1 - pentene, 20.6% of 4-methyl - 2 - pentene, and 8.7% of other hexenes.

*Example 5*

An autoclave, fitted for continuous processing was charged with 10 grams (0.83 mole) of dried carbon, 22.2 grams (0.57 mole) of potassium, 3.7 grams of dipropylamine, and 300 ml. of a solvent, 2,2,4 - trimethylpentane (isooctane). Propylene, under pressure, was added at an average rate of about 34 grams per hour. Within the continuous processor, the temperature was maintained in the range of 100°–153° C. and the pressure was maintained at 910 p.s.i.g. The solvent solution containing product was drawn off continuously and analyzed. Analysis indicated that, on the average, 41.9% of the propylene had polymerized, being converted into 76.9% of 4 - methyl-1 - pentene, 8.2% of 4 - methyl - 2 - pentene, 6.9% of other hexenes, and 8.0% of higher molecular weight polymers.

*Example 6*

A 5-gram (0.42 mole) sample of dried carbon was placed in a 500-ml. autoclave. To this reaction vessel were added 10 grams (0.26 mole) of potassium, 2 grams of diallylamine, and 251.6 grams of propylene. The reaction mixture was heated at 150° C. for 5.5 hours. During this period, the pressure in the reaction vessel decreased from 2875 p.s.i.g. to 1190 p.s.i.g. The liquid product was removed from the reaction vessel and analyzed. Analysis indicated that 45.2% of the propylene had polymerized, being converted into 48.5% of 4 - methyl - 1 - pentene 39.3% of 4 - methyl - 2 - pentene, 9.1% of other hexenes, and 3.1% of higher molecular weight polymers.

*Example 7*

A 5-gram (0.42 mole) sample of dried carbon was placed in a 500-ml. autoclave. To this reaction vessel were added 10 grams (0.26 mole) of potassium, 1.7 grams of ethylenediamine, and 254.0 grams of propylene. The reaction mixture was heated at 150° C. for 4 hours. During this period, the pressure in the reaction vessel decreased from 2820 p.s.i.g. to 840 p.s.i.g. The liquid product was removed from the reaction vessel and analyzed. Analysis indicated that 48.4% of the propylene had polymerized, being converted into 54.8% of 4 - methyl - 1 - pentene, 28.6% of 4 - methyl - 2 - pentene, 14.8% of other hexenes, and 1.8% of higher molecular weight polymers.

*Example 8*

A 10-gram (0.83 mole) sample of dried carbon was placed in a 500-ml. autoclave. To this reaction vessel were added 5.0 grams (0.13 mole) of potassium, 3.0 grams of dipropylamine, and 250 grams of propylene. The reaction mixture was heated at 150° C. for 4 hours. The liquid product was removed and analyzed. Analysis indicated that 43.6% of the propylene had polymerized, being converted into 43.0% of 4 - methyl - 1 - pentene, 47.9% of 4 - methyl - 2 -pentene, 6.1% of other hexenes, and 3.0% of higher molecular weight polymers.

*Example 9*

Reusing the catalyst from Example 8, an additional 20 g. (0.52 mole) of potassium, 0.8 g. of dipropylamine and 250.5 g. of propylene were added to the autoclave. The reaction mixture was heated with stirring at 150° C. for 2 hours. The liquid product was removed and analyzed. Analysis indicated that 52.3% of the propylene had polymerized, being converted into 82% of 4 - methyl-1 - pentene, 10% of 4 - methyl - 2 - pentene, 7% of other hexenes, and 1% of higher molecular weight polymers.

*Example 10*

The catalyst remaining from Example 9 was reused. To the autoclave were added 252.0 g. of propylene. The reaction mixture was heated at 135°–150° C. for 1 hour. Analysis of the products indicated that 60.8% of the propylene had polymerized, being converted into 81% of 4 - methyl - 1 - pentene, 10% of 4 - methyl - 2 - pentene, 7% of other hexenes, and 2% of higher molecular weight polymers.

*Example 11*

The catalyst of Example 10 was reused. To the autoclave were added 268.4 g. of propylene. The reaction mixture was heated at 143°–149° C. for 1½ hours. During this period, the pressure in the reaction vessel decreased from 4575 p.s.i.g. to 800 p.s.i.g. The liquid product was removed from the reaction vessel and analyzed. Analysis indicated that 70.2% of the propylene had polymerized, being converted into 79% of 4 - methyl - 1 - pentene, 11% of 4 - methyl - 2 - pentene, 8% of other hexenes, and 2% of higher molecular weight polymers.

*Example 12*

A 10.0 g. (0.84 mole) sample of Pittsburgh activated carbon, type SGL, was placed in a 500-ml. packless stirred autoclave. To this reaction vessel was added 20.0 g. (0.51 mole) of potassium, 2 g. of dipropylamine, 163.6 g. of 2-methylpropene (isobutylene) and 100.6 g. of propylene. The reaction mixture was heated at 150° C. for 11 hours. The liquid product was removed from the reaction vessel and analyzed. Analysis indicated that 86.0 g. (32.5%) of the olefin mixture had polymerized, being converted into 0.1% of 3-methyl-1-pentene, 18.9% of 4-methyl-1-pentene, 6.9% of 4-methyl-2-pentene, 4.4% of 1- and 2-hexene, 55.8% of 2,4-dimethyl-1-pentene, 4.8% of 2,4-dimethyl-2-pentene, 4.9% of 2,4,4-trimethyl-1-pentene and 4.2% of higher molecular weight polymers.

*Example 13*

A 10.0 g. (0.84 mole) sample of dried carbon was placed in a 500-ml. packless stirred autoclave. To this reaction vessel was added 20.0 g. (0.51 mole) of potassium, 1.5 g. of dipropylamine, and 263.2 g. of 2-methylpropene (isobutylene). The reaction mixture was heated at 150° C. for 7 hours. The liquid product was removed from the reaction vessel and analyzed. Analysis indicated that 52.9 g. (20.6%) of the 2-methylpropene had polymerized, being converted into 75.6% of 2,4,4-trimethyl-1-pentene, 13.3% of 2,5-dimethyl-1-hexene, and 11.1% of other octenes.

*Example 14*

A 5.0 g. (0.42 mole) sample of activated carbon was placed in a 500-ml. autoclave. To this reaction vessel was added 12.0 g. (0.30 mole) of potassium, 1.5 g. of dipropylamine, 100.3 g. of 2-methylpropene (isobutylene) and 170.7 g. of propylene. The reaction mixture was heated at 150° C. for 8 hours. The liquid product was removed from the reaction vessel and analyzed. Analysis indicated that 57.8% of the olefin mixture had polymerized, being converted into 51.4% of 4-methyl-1-pentene, 14.0% of 4-methyl-2-pentene, 4.4% of 1- and 3-hexene, 2.3% of 2,3-dimethyl-2-butene, 25.1% of 2,4-dimethyl-1-pentene and 1.5% of 2,4,4-trimethyl-2-pentene.

*Example 15*

A 5.0 g. (0.42 mole) sample of activated carbon was placed in a 500-ml. autoclave. To this reaction vessel was added 10.7 g. (0.27 mole) of potassium, 0.8 g. of dipropylamine, and 245.0 g. of 1-butene. The reaction mixture was heated at 150°–200° C. for 8 hours. The liquid product was removed from the reaction vessel and analyzed. Analysis indicated that 46.5% of the 1-butene had polymerized, being converted into 26.0% of 3,4-dimethyl-2-hexene, 15.4% of 1-octene, 6.8% of 2-octene, 25.4% of other octenes, and 22.9% of higher molecular weight polymers.

*Example 16*

A 5.0 g. (0.42 mole) sample of activated carbon was placed in a 500-ml. autoclave. To this reaction vessel was added 10.0 g. (0.26 mole) of potassium, 1.5 g. of dipropylamine, 91.4 g. of 2-butene, and 156.9 g. of propylene. The reaction mixture was heated with stirring at 150° C. for 7 hours. The liquid product was removed from the reaction vessel and analyzed. Analysis indicated that 35.9% of the olefin mixture had polymerized, being converted into 52.8% of 4-methyl-1-pentene, 9.1% of 4-methyl-2-pentene, 5.0% of 1- and 2-hexene, 2.7% of 2,3-dimethyl-2-butene, 12.9% of 3,4-dimethyl-1-pentene, 3.2% of 5-methyl-2-hexene, 1.7% of 2,4,4-trimethyl-1-pentene, 2.4% of other heptenes, and 10.1% of higher molecular weight polymers.

*Example 17*

A 5.0 g. (0.42 mole) sample of dried carbon was placed in a 500-ml. autoclave. To this reaction vessel was added 14.1 g. (0.36 mole) of potassium, 1.5 g. of dipropylamine, and 129.1 g. of ethylene. The reaction mixture was heated at 150° C. for 13 hours. The liquid product was removed from the reaction vessel and analyzed. Analysis indicated that 52.6% of the ethylene polymerized, being converted into 20.4% of 3-methyl-1-pentene, 3.4% of other hexenes, 11.0% of 3-methyl-1-heptene, 40.3% of 3,4-dimethyl-1-hexene, 18.5% of decenes, and 4.5% of dodecene and higher molecular weight polymers.

*Example 18*

A 5.0 g. (0.42 mole) sample of dried carbon was placed in a 500-ml. autoclave. To this reaction vessel were added 14.1 g. (0.36 mole) of potassium, 1.5 g. of dipropylamine, 108.9 g. of propylene, and 82.5 g. of ethylene. The reaction mixture was heated at 150° C. for 7 hours. The liquid product was removed from the reaction vessel and analyzed. Analysis indicated that 39.7% of the olefin mixture had polymerized, being converted into 3.1% of butenes, 30.5% of 3-methyl-1-butene, 41.0% of 2-methyl-1-butene, 2.7% of 4-methyl-1-pentene, 2.0% of 4-methyl-2-pentene, 4.7% of heptenes, 8.0% of octenes, and 6.3% of higher molecular weight polymers.

*Example 19*

The catalyst of Example 18 was reused. To the autoclave were added 109.4 of propylene and 89.0 g. of ethylene. The reaction mixture was heated at 150° C. for 6 hours. The liquid product was removed from the reaction vessel and analyzed. Analysis indicated that 44.2% of the olefin mixture had polymerized, being converted into 55.7% of 2-methyl-1-butene, 27.9% of 3-methyl-1-butene, 4.3% of hexenes, 5.2% of heptenes, 3.1% of octenes, and 3.7% of higher molecular weight polymers.

What is claimed is:

1. The process for polymerizing an aliphatic 1-olefine hydrocarbon feed material having up to and including 5 carbon atoms per molecule, which comprises contacting under polymerizing conditions said hydrocarbon feed material with a catalyst composition consisting essentially of activated carbon, potassium and a nitrogen containing compound from the group consisting of ammonia, primary, secondary and tertiary amines, the amount of catalyst composition falling within the range of from 0.01 weight percent to 25.0 weight percent of the hydrocarbon, the ratio of carbon to potassium falling within the range of 0.01 to 100 mol of carbon per mol of potassium and the nitrogen containing compound being present in an amount of from .001 to 5 weight percent, based on the hydrocarbon feed material.

2. The process according to claim 1 wherein the hydrocarbon feed material is ethylene.

3. The process according to claim 1 wherein the hydrocarbon feed material is propylene.

4. The process according to claim 1 wherein the hydrocarbon feed material is 2-methylpropene.

5. The process according to claim 1 wherein the hydrocarbon feed material is 1-butene.

6. The process according to claim 1 wherein the hydrocarbon feed material is 2-butene.

7. The process according to claim 1 wherein the nitrogen-containing compound is dipropylamine.

8. The process according to claim 1 wherein the nitrogen-containing compound is diallylamine.

9. The process according to claim 1 wherein the nitrogen-containing compound is ethylenediamine.

References Cited

UNITED STATES PATENTS

| | | | |
|---|---|---|---|
| 3,217,050 | 11/1965 | Schriesheim et al. | 260—683.15 X |
| 3,251,895 | 5/1966 | Wilkes | 260—683.15 X |
| 3,028,441 | 4/1962 | Bush et al. | 260—683.15 |
| 3,075,027 | 1/1963 | Bittner et al. | 260—683.15 |
| 3,084,206 | 4/1963 | Yeo et al. | 260—683.15 |
| 3,128,318 | 4/1964 | Meisinger et al. | 260—683.15 |

PAUL M. COUGHLAN, Jr., *Primary Examiner.*